US012315425B2

(12) United States Patent
Cheng

(10) Patent No.: US 12,315,425 B2
(45) Date of Patent: May 27, 2025

(54) DISPLAY DRIVER CIRCUIT

(71) Applicant: Novatek Microelectronics Corp., Hsinchu (TW)

(72) Inventor: Huan-Teng Cheng, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/465,988

(22) Filed: Sep. 13, 2023

(65) Prior Publication Data

US 2024/0355261 A1 Oct. 24, 2024

Related U.S. Application Data

(60) Provisional application No. 63/468,544, filed on May 24, 2023, provisional application No. 63/460,613, filed on Apr. 20, 2023.

(51) Int. Cl.
*G09G 3/20* (2006.01)

(52) U.S. Cl.
CPC ....... *G09G 3/2096* (2013.01); *G09G 2310/06* (2013.01); *G09G 2310/08* (2013.01); *G09G 2340/0435* (2013.01); *G09G 2370/00* (2013.01)

(58) Field of Classification Search
None
See application file for complete search history.

(56) References Cited

U.S. PATENT DOCUMENTS

2009/0115771 A1* 5/2009 Washio ................ G09G 3/3688 345/87
2020/0273401 A1 8/2020 Lee
2022/0327999 A1 10/2022 Choi et al.

FOREIGN PATENT DOCUMENTS

CN 110164382 8/2019

OTHER PUBLICATIONS

"Office Action of Taiwan Counterpart Application", issued on Aug. 5, 2024, p. 1-p. 5.

* cited by examiner

*Primary Examiner* — Christopher J Kohlman
(74) *Attorney, Agent, or Firm* — JCIPRNET

(57) ABSTRACT

A display driver circuit including a gate signal control circuit is provided. The gate signal control circuit is configured to output a clock signal to drive a display panel to operate in a first mode or a second mode. The display panel includes a first area and a second area. In the second mode, a pulse width of the clock signal driving the first area of the display panel is smaller than a pulse width of the clock signal driving the second area of the display panel.

17 Claims, 8 Drawing Sheets

DISPLAY DRIVER CIRCUIT

CROSS-REFERENCE TO RELATED APPLICATION

This application claims the priority benefit of U.S. provisional application Ser. No. 63/460,613, filed on Apr. 20, 2023, and U.S. provisional application Ser. No. 63/468,544, filed on May 24, 2023. The entirety of the above-mentioned patent applications is hereby incorporated by reference herein and made a part of this specification BACKGROUND

TECHNICAL FIELD

The invention generally relates to a driver circuit. More particularly, the invention relates to a display driver circuit.

DESCRIPTION OF RELATED ART

The display panel of multi-area frame rate (MAFR) can be controlled by mask signals to mask off scan lines, so that some areas are not updated to maintain the previous image content. Due to the bottleneck of RC loading in the panel itself, the frame rate cannot be increased, and thus the panel products cannot be upgraded to a higher frame rate. For example, 120 Hz cannot be upgraded to 144 Hz. The MAFR panel technology only focuses on frame rate reduction and power saving applications. The maximum frame rate does not exceed the base frame rate.

SUMMARY

The invention is directed to a display driver circuit, capable of driving a display panel with a frame rate boost mode for situations that need to enhance the dynamic performance.

An embodiment of the invention provides a display driver circuit including a gate signal control circuit. The gate signal control circuit is configured to output a clock signal to drive a display panel to operate in a first mode or a second mode. The display panel includes a first area and a second area. In the second mode, a pulse width of the clock signal driving the first area of the display panel is smaller than a pulse width of the clock signal driving the second area of the display panel.

An embodiment of the invention provides a display driver circuit including a gate signal control circuit. The gate signal control circuit is configured to output a clock signal to drive a display panel to operate in a first mode or a second mode. The display panel includes a plurality of scan lines, and the display panel includes a first area and a second area. In the second mode, the gate signal control circuit stops outputting pulses of the clock signal to drive the scan lines corresponding to the first area.

In an embodiment of the invention, the gate signal control circuit is further configured to output an enable signal to drive the display panel. The enable signal indicates the first area and the second area of the display panel in the second mode.

In an embodiment of the invention, the display driver circuit further includes a digital circuit. The digital circuit is coupled to the gate signal control circuit. The digital circuit is configured to generate a horizontal synchronization signal. The horizontal synchronization signal comprises a plurality of pulses. A first width between two pulses of the horizontal synchronization signal corresponding to the first area is smaller than a second width between two pulses of the horizontal synchronization signal corresponding to the second area in the second mode.

In an embodiment of the invention, the second width in the second mode is equal to the second width in the first mode.

In an embodiment of the invention, the second width in the second mode is larger than the second width in the first mode.

In an embodiment of the invention, the display driver circuit receives image data from a processor circuit in a first bit rate in the first mode, and receives the image data from the processor circuit in a second bit rate in the second mode. The second bit rate is slower than the first bit rate.

In an embodiment of the invention, the second area is displayed with a first frame rate in the first mode, and the second area is displayed with a second frame rate in the second mode. The second frame rate is larger than the first frame rate.

In an embodiment of the invention, a frame period of the second mode is smaller than a frame period of the first mode.

In an embodiment of the invention, the second area is displayed with a first frame rate in the first mode, and the second area is displayed with a second frame rate in the second mode. The second frame rate is equal to the first frame rate.

In an embodiment of the invention, a frame period of the second mode is equal to a frame period of the first mode.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Embodiments are provided below to describe the disclosure in detail, though the disclosure is not limited to the provided embodiments, and the provided embodiments can be suitably combined. The term "coupling/coupled" or "connecting/connected" used in this specification (including claims) of the application may refer to any direct or indirect connection means. For example, "a first device is coupled to a second device" should be interpreted as "the first device is directly connected to the second device" or "the first device is indirectly connected to the second device through other devices or connection means." The term "signal" can refer to a current, a voltage, a charge, a temperature, data, electromagnetic wave or any one or multiple signals. In addition, the term "and/or" can refer to "at least one of". For example, "a first signal and/or a second signal" should be interpreted as "at least one of the first signal and the second signal".

Figure 1:
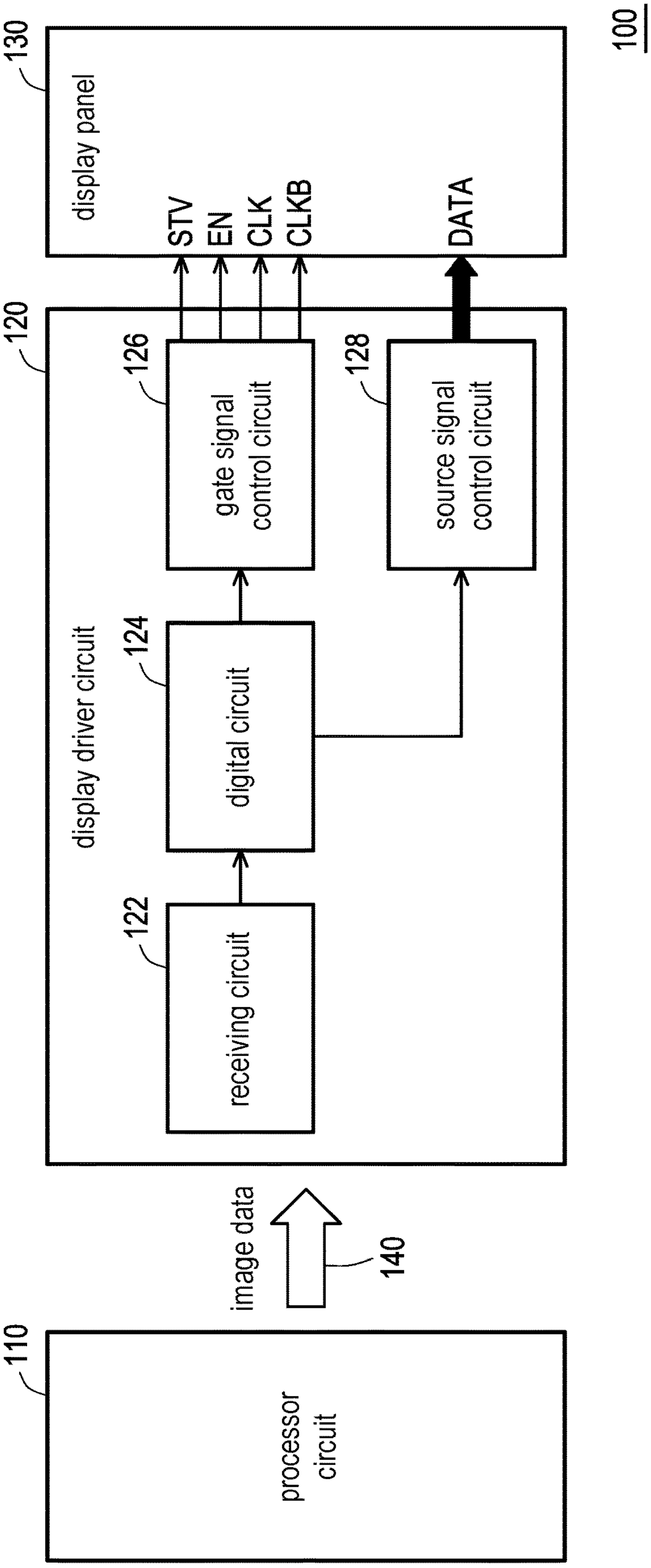
FIG. 1 is a block diagram illustrating an electronic apparatus according to an embodiment of the invention.

FIG. 1 is a block diagram illustrating an electronic apparatus according to an embodiment of the invention. Referring to FIG. 1, the electronic device 100 includes a processor circuit 110, a display driver circuit 120, and a display panel 130. The processor circuit 110 is configured to output image data to the display driver circuit 120 via a signal transmission interface 140. The processor circuit 110 may be a timing controller of a display apparatus or an application processor of a smartphone, but the invention is not limited thereto.

The display driver circuit 120 is coupled to the processor circuit 110. The display driver circuit 120 is configured to receive the image data from the processor circuit 110, and drive the display panel 130 to display an image according to the image data. The image includes a plurality of image frames, and the plurality of image frames form the image. The display panel 130 is coupled to the display driver circuit 120. The display panel 130 may be a panel of multi-area frame rate (MAFR), but the invention is not limited thereto. The display panel 130 can display images that have multi-areas with different frame rates.

In an embodiment, the electronic device 100 may be an electronic device having a display function, a touch sensing function and/or a fingerprint sensing function. In an embodiment, the electronic device 100 may be, but not limited to, a smartphone, a non-smart phone, a wearable electronic device, a tablet computer, a personal digital assistant, a notebook and other portable electronic devices that can operate independently and have the display function, the touch sensing function and the fingerprint sensing function. In an embodiment, the electronic device 100 may be, but not limited to, a portable or un-portable electronic device in a vehicle intelligent system. In an embodiment, the electronic device 100 may be, but not limited to, intelligent home appliances such as, a television, a computer, a refrigerator, a washing machine, a telephone, an induction cooker, a table lamp and so on.

In an embodiment, the display driver circuit 120 may be an integrated circuit that can drive the display panel 130 to perform the display function, the touch sensing function and/or the fingerprint sensing function.

In an embodiment, the signal transmission interface 140 may be Mobile Industry Processor Interface (MIPI), Inter-Integrated Circuit (I2C) Interface, Serial Peripheral Interface (SPI) and/or other similar or suitable interfaces.

Figure 2A:
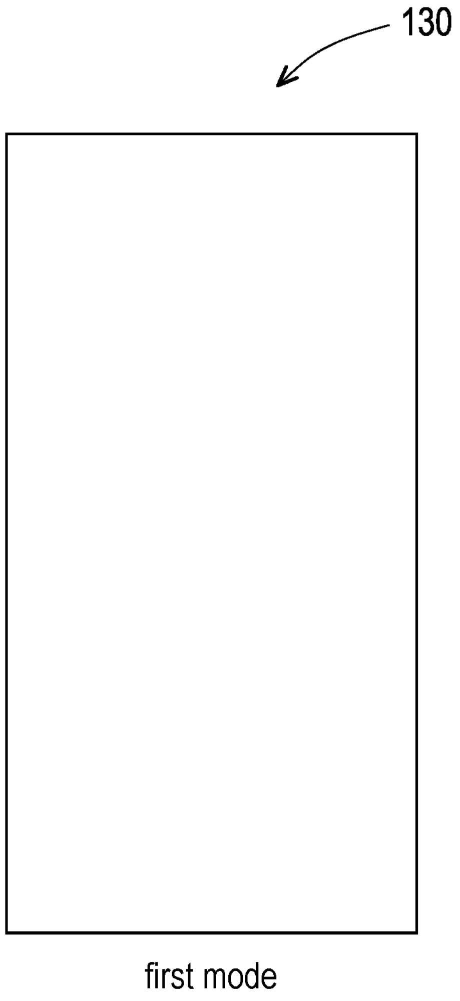
FIG. 2A and FIG. 2B are schematic diagrams respectively illustrating the display panel operating in a first mode and a second mode according to an embodiment of the invention.
Figure 2B:
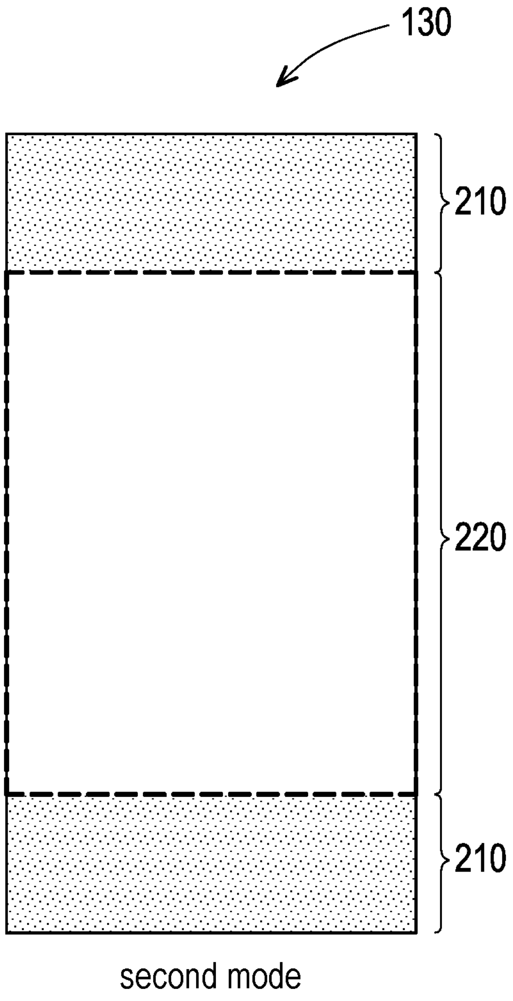

FIG. 2A and FIG. 2B are schematic diagrams respectively illustrating the display panel operating in a first mode and a second mode according to an embodiment of the invention. Referring to FIG. 2A and FIG. 2B, the display driver circuit 120 may drive the display panel 130 to operate in the first mode or the second mode. In FIG. 2A, the display panel 130 displays a whole image with a specified frame rate in the first mode. The specified frame rate may be 120 Hz, but the invention is not limited thereto. In FIG. 2B, the display panel 130 displays images having multi-areas with different frame rates in the second mode.

To be specific, in FIG. 2B, the display panel 130 includes a first area 210 and a second area 220. The first area 210 is divided into two separate parts. The first area 210 and the second area 220 have different frame rates. The second area 220 is displayed with a first frame rate in the first mode, and the second area 220 is displayed with a second frame rate in the second mode. The second frame rate is larger than the first frame rate. For example, in the second mode, the frame rate of the second area 220 is boosted from 120 Hz (first frame rate) to 144 Hz (second frame rate), and the frame rate of the first area 210 is maintained at 120 Hz or smaller than 120 Hz. Relatively dynamic image content may be displayed in the second area 220, and relatively static image content or image content that does not need to be updated may be displayed in the first area 210. In the present embodiment, the second mode is a frame rate boost mode, for situations that need to enhance the dynamic performance, e.g. camera shooting, game interface, etc. The frame rates 120 Hz and 144 Hz are taken for examples, and they do not intend to limit the invention.

In an embodiment, the frame rate of the second area 220 is not boosted but maintained at 120 Hz in the second mode. That is, the second frame rate of the second area 220 is equal to the first frame rate.

Figure 3:
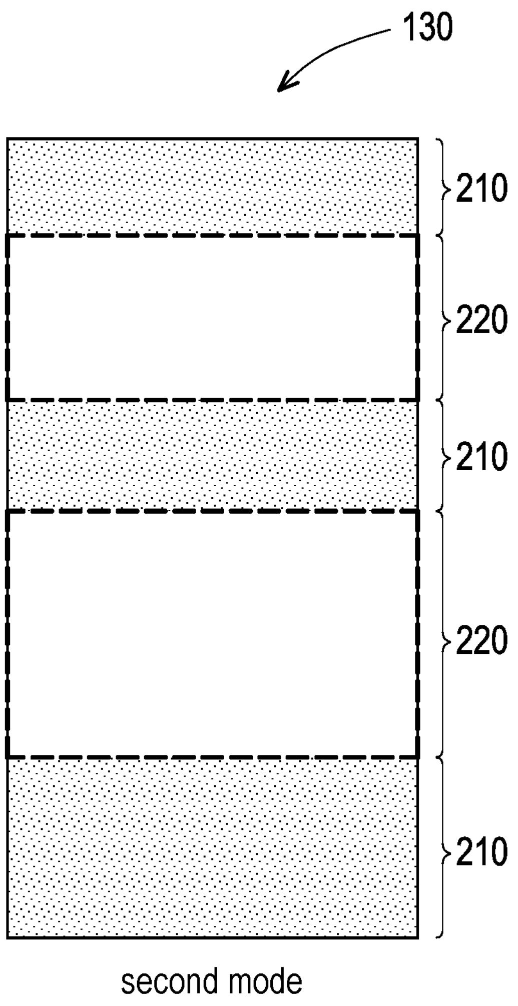
FIG. 3 is a schematic diagram illustrating the display panel operating in the second mode according to another embodiment of the invention.

FIG. 3 is a schematic diagram illustrating the display panel operating in the second mode according to another embodiment of the invention. Referring to FIG. 2B and FIG. 3, in FIG. 2B, the second area 210 is not divided into different parts, but in FIG. 3, the second area 210 is divided into two separate parts. That is to say, the invention does not intend to limit the number and the shape of the second area 210.

How to drive the display panel 130 to operate in the first mode and the second mode will be described.

Returning to FIG. 1, the display driver circuit 120 includes a receiving circuit 122, a digital circuit 124, a gate signal control circuit 126, and a source signal control circuit 128. The digital circuit 124 is coupled to the gate signal control circuit 126. The receiving circuit 122 receives the image data from the processor circuit 110 via the signal transmission interface 140. The receiving circuit 122 may include an AFE circuit and/or an ADC circuit, for example. The digital circuit 124 receives signals and data from the receiving circuit 122, and outputs processed signals and data to the gate signal control circuit 126 and the source signal control circuit 128, respectively.

The gate signal control circuit 126 is configured to output clock signals CLK and CLKB, a start pulse signal STV, and an enable signal EN to the display panel 130, e.g. a gate driver on array (GOA) circuit thereon. The display panel 130 is driven to operate in the first mode or the second mode. The source signal control circuit 128 is configured to output the image data DATA to pixels via data lines to the display panel 130. For conciseness, the pixels and the data lines of the display panel 130 are not illustrated in FIG. 1.

Implementation and circuit structures of the receiving circuit 122, the digital circuit 124, the gate signal control circuit 126, and the source signal control circuit 128 can be sufficiently taught, suggested, and embodied with reference to common knowledge in the related art.

Figure 4:
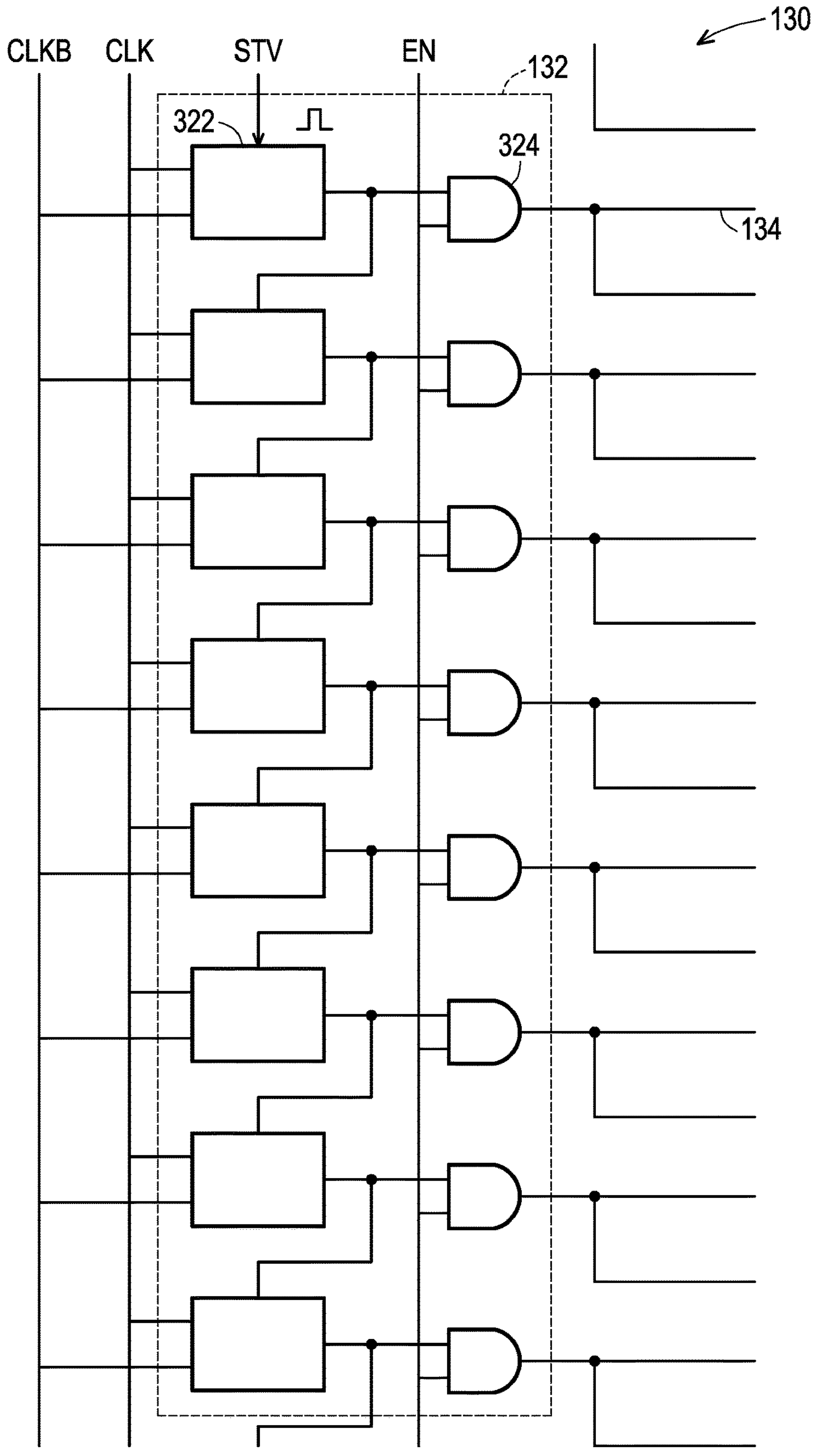
FIG. 4 is a schematic diagram illustrating a GOA circuit according to an embodiment of the invention.

FIG. 4 is a schematic diagram illustrating a GOA circuit according to an embodiment of the invention. Referring to FIG. 4, the display panel 130 includes the GOA circuit 132 and a plurality of scan lines 134. The GOA circuit 132 receives the CLK, CLKB, STV and EN signals from the gate signal control circuit 126. The GOA circuit 132 includes a plurality of latch circuits 322 and logic gates 324. The latch circuits 322 and the logic gates 324 are coupled to the corresponding scan lines 134. The latch circuits 322 may sequentially output the clock signals CLK and CLKB to the corresponding scan lines according to a start pulse signal STV. The clock signals CLK and CLKB serve as scan signals and are applied to the corresponding scan lines, such that the pixels of the display panel 130 can be turned on.

The logic gates 324 determines whether the clock signals CLK and CLKB outputted from the latch circuits 322 can be outputted to the corresponding scan lines 134 according to an enable signal EN. For example, when the enable signal EN is at a low level, the clock signals CLK and CLKB cannot be outputted to the corresponding scan lines 134, and when the enable signal EN is at a high level, the clock signals CLK and CLKB can be outputted to the corresponding scan lines 134. In FIG. 4, the logic gates 324 are AND gates, but the invention is not limited thereto.

The gate signal control circuit 126 is configured to output the clock signals CLK and CLKB, the start pulse signal STV, and the enable signal EN to the GOA circuit 132 to drive the display panel 130 to display images. The gate signal control circuit 126 may drive the display panel 130 to operate in the first mode or the second mode. The GOA circuit 132 generates and outputs the scan signals to the corresponding scan lines 134 according to the CLK, CLKB, STV and EN signals, such that the pixels of the display panel 130 can be turned on, and the image data DATA is written into the pixels via the data lines.

Figure 5A:
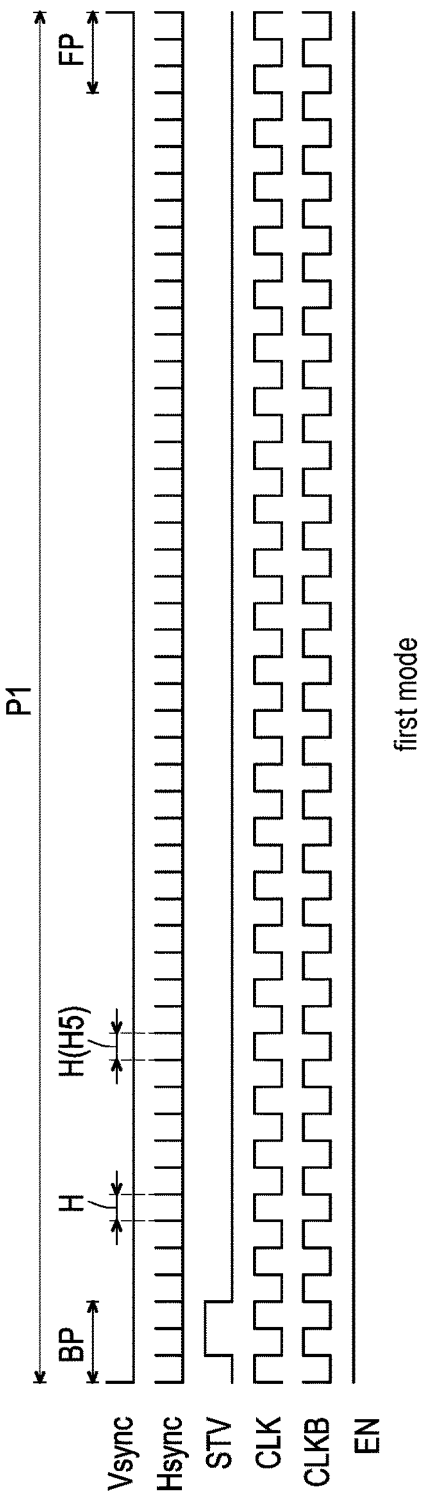
FIG. 5A and FIG. 5B are waveform diagrams respectively illustrating scan control signals of the first mode and the second mode according to an embodiment of the invention.
Figure 5B:
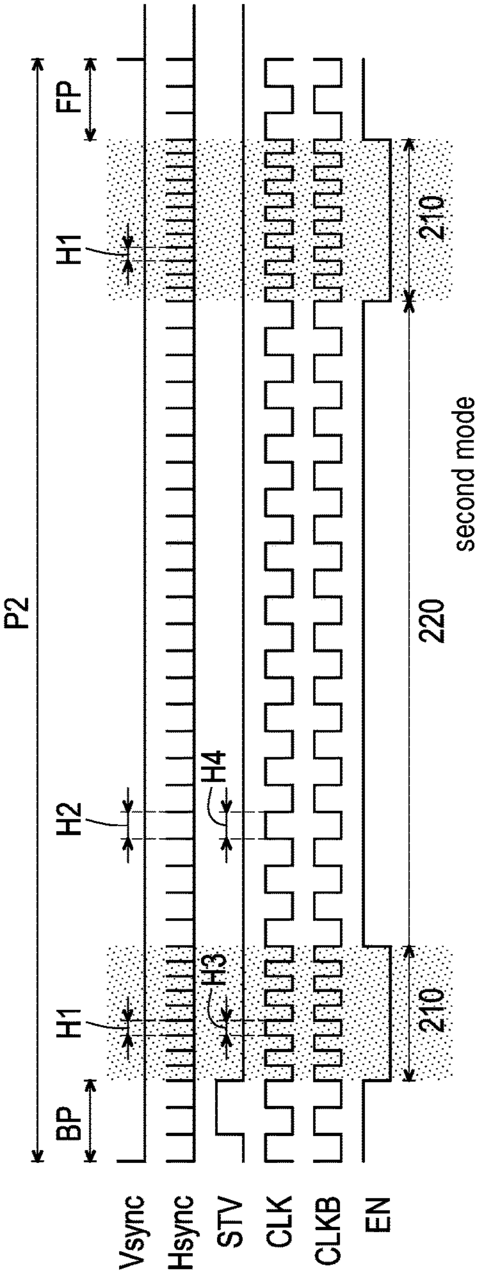

FIG. 5A and FIG. 5B are waveform diagrams respectively illustrating scan control signals of the first mode and the second mode according to an embodiment of the invention. Referring to FIG. 5A and FIG. 5B, the scan control signals include the CLK, CLKB, STV and EN signals, a horizontal synchronization signal Hsync and a vertical synchronization signal Vsync. In FIG. 5A and FIG. 5B, only a frame period of an image frame in the first mode and in the second mode are illustrated, and a plurality of image frames form an image. Periods BP and FP are back porch and front porch periods, respectively.

In the present embodiment, the enable signal EN indicates the first area 210 and the second area 220 of the image in the second mode. For example, a high level of the enable signal EN indicates pulses of the clock signals CLK and CLKB are applied to the scan lines 134 corresponding to the first area 210, and a low level of the enable signal EN indicates pulses of the clock signals CLK and CLKB are applied to the scan lines 134 corresponding to the second area 220. In an embodiment, the low level of the enable signal EN may indicates the first area 210, and the high level of the enable signal EN may indicates the second area 220. The invention does not intend to limit the level of the enable signal EN for indicating the areas.

In the first mode, the first area 210 and the second area 220 are displayed with the first frame rate, and in the second mode, the frame rate of the second area 220 is boosted to the second frame rate, and the frame rate of the first area 210 is maintained at the first frame rate or smaller than the first frame rate. The second frame rate is larger than the first frame rate. In addition, a frame period P2 of the second mode is smaller than a frame period P1 of the first mode.

To be specific, the digital circuit 124 is configured to generate the horizontal synchronization signal Hsync and the vertical synchronization signal Vsync according to the image data from the processor circuit 110. The vertical synchronization signal Vsync indicates a frame period of an image frame. The horizontal synchronization signal Hsync includes a plurality of pulses. A width between two pulses of the horizontal synchronization signal Hsync indicates a time length that a scan line is charged.

In the first mode, each width H between two pulses of the horizontal synchronization signal Hsync is the same, as illustrated in FIG. 5A. In the second mode, a first width H1 between two pulses of the horizontal synchronization signal Hsync corresponding to the first area 210 is smaller than a second width H2 between two pulses of the horizontal synchronization signal Hsync corresponding to the second area 220, as illustrated in FIG. 5B. Therefore, the scan lines corresponding to the first area 210 can be charged quickly to shorten the frame period P2 of the second mode, such that the frame period P2 of the second mode is smaller than the frame period P1 of the first mode.

In addition, the second width H2 in the second mode is equal to the second width H5 in the first mode. Even if the second area is boosted from a lower frame rate to a higher frame rate in the second mode, the second widths H2 and H5 between two pulses of the horizontal synchronization signal Hsync are still maintained.

Next, the gate signal control circuit 126 generates and outputs the CLK and CLKB signals according to the horizontal synchronization signal Hsync. The clock signal CLKB is an inverse signal of the clock signal CLK, and the clock signals CLK and CLKB are outputted to the GOA circuit 132.

In the second mode, since the first width H1 of the horizontal synchronization signal Hsync is smaller than the second width H2 of the horizontal synchronization signal Hsync, a pulse width H3 of the clock signal CLK driving the first area 210 of the display panel 130 is smaller than a pulse width H4 of the clock signal CLK driving the second area 220 of the display panel 130. Therefore, the scan lines corresponding to the first area 210 can be charged quickly to shorten the frame period P2 of the second mode, such that the frame period P2 of the second mode is smaller than the frame period P1 of the first mode. By accelerating the driving period of the first areas to compress the time required for the entire frame, it is equivalent to increase the frame rate, and the pulse width of the clock signal is enough to maintain the safe charging time to avoid visual problems.

Figure 6:
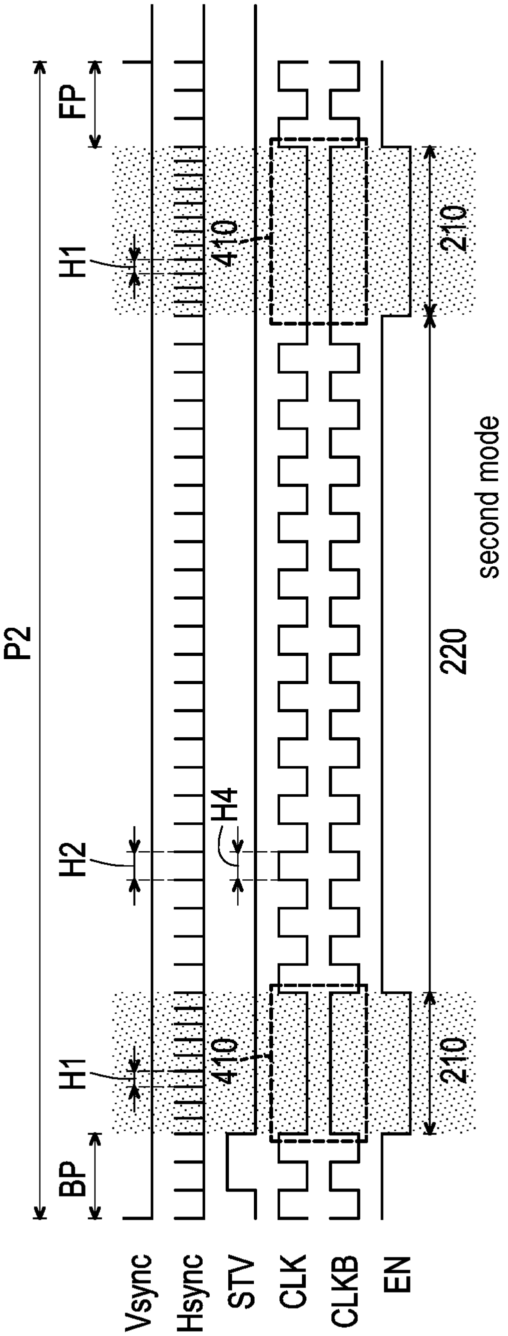
FIG. 6 is a waveform diagram illustrating scan control signals of the second mode according to another embodiment of the invention.

FIG. 6 is a waveform diagram illustrating scan control signals of the second mode according to another embodiment of the invention. Referring to FIG. 6, in the second mode, the image content of the first area 210 may be a static image content or an image content that does not need to be updated, and thus the gate signal control circuit 126 stops outputting the pulses of the clock signals CLK and CLKB to drive the scan lines corresponding to the first area 210, as illustrated in dotted blocks 410 in FIG. 6.

Figure 7A:
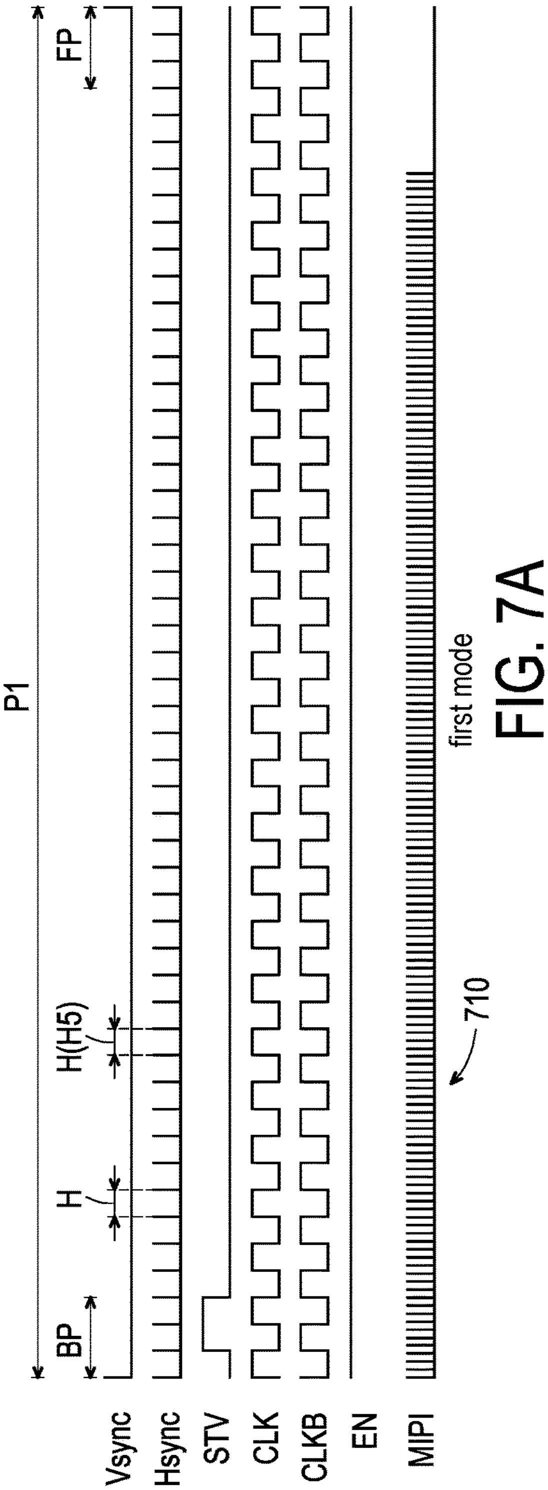
FIG. 7A and FIG. 7B are waveform diagrams respectively illustrating scan control signals of the first mode and the second mode according to another embodiment of the invention.
Figure 7B:
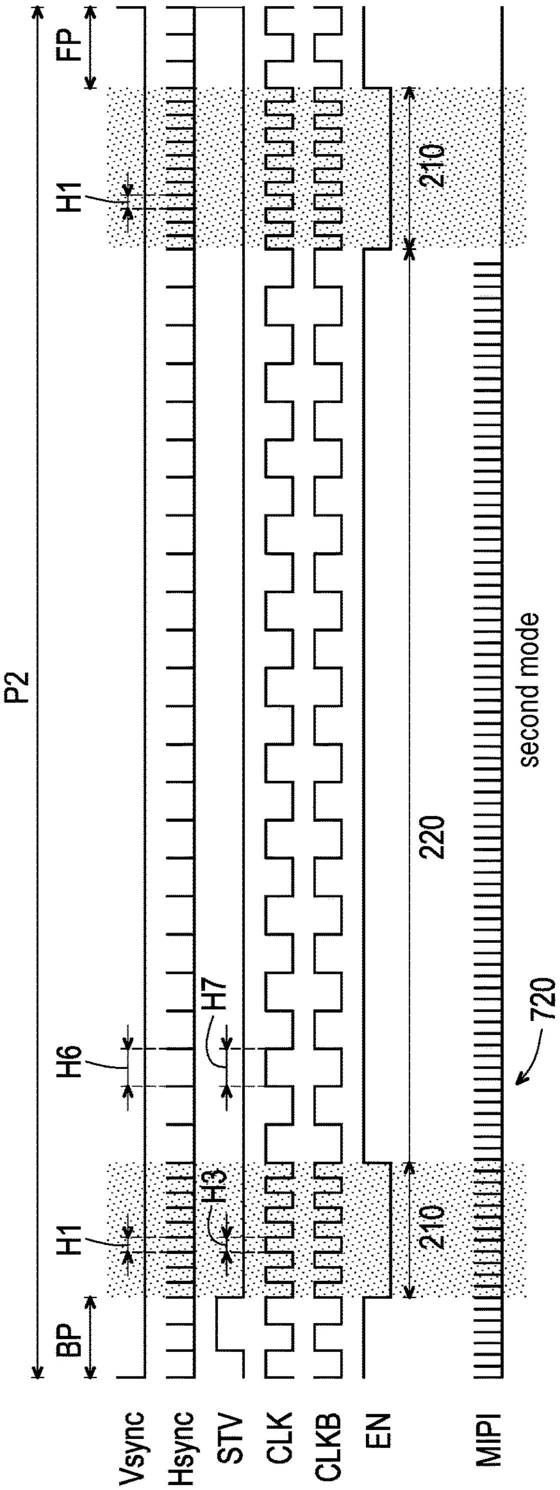

FIG. 7A and FIG. 7B are waveform diagrams respectively illustrating scan control signals of the first mode and the second mode according to another embodiment of the invention. Referring to FIG. 7A and FIG. 7B, the image data 710 and 720 transmitted via the signal transmission interface 140 are further illustrated. Taking MIPI for example, the image data 710 and 720 may be transmitted with specified bit rates via the signal transmission interface 140.

The second area 220 is displayed with the first frame rate in the first mode, and the second area 220 is displayed with the second frame rate in the second mode, where the second frame rate is equal to the first frame rate. In addition, the frame period P2 of the second mode is equal to the frame period P1 of the first mode.

In the present embodiment, the second width H6 between two pulses of the horizontal synchronization signal Hsync in the second mode is larger than the second width H5 between two pulses of the horizontal synchronization signal Hsync in the first mode. The image data 720 may be transmitted with a slower bit rates than the image data 710. To be specific, the display driver circuit 120 receives the image data 710 from the processor circuit 110 in a first bit rate in the first mode, and receives the image data 720 from the processor circuit 110 in a second bit rate in the second mode. The second bit rate is slower than the first bit rate. Therefore, the power consumption of the electronic device 100 can be reduced in the second mode.

Figure 8:
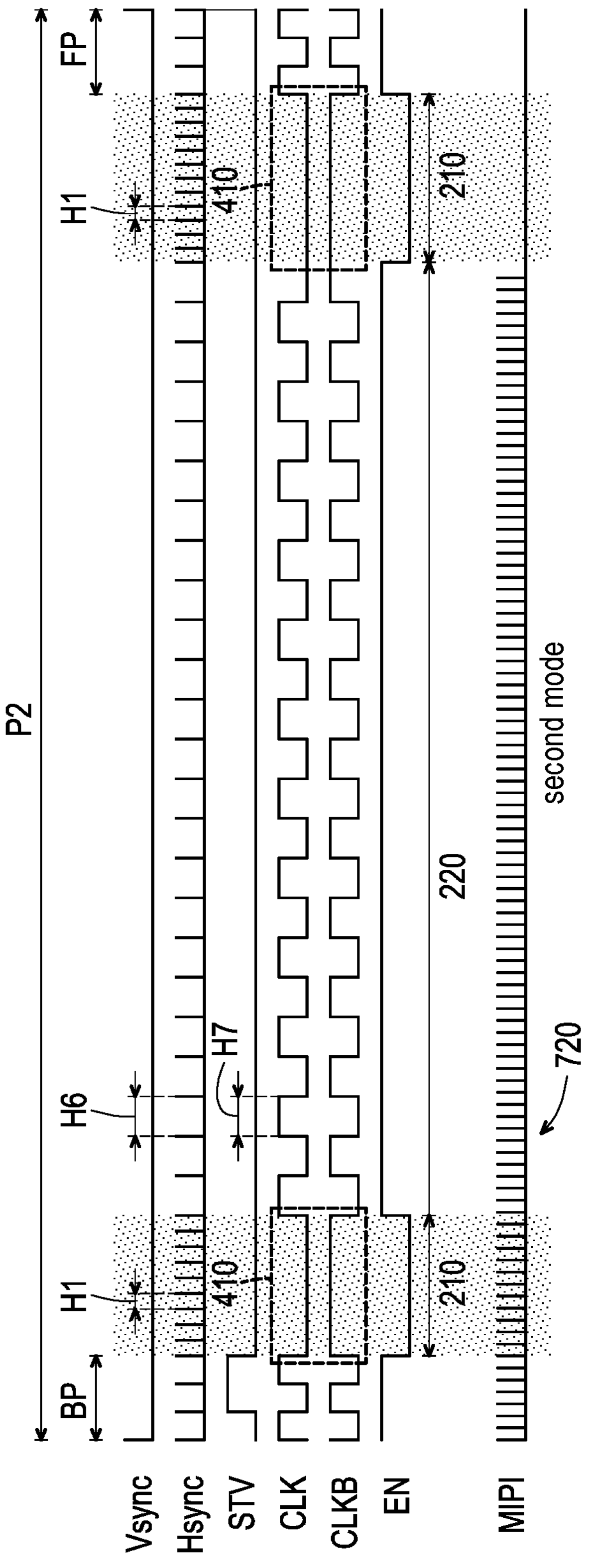
FIG. 8 is a waveform diagram illustrating scan control signals of the second mode according to another embodiment of the invention.

FIG. 8 is a waveform diagram illustrating scan control signals of the second mode according to another embodiment of the invention. Referring to FIG. 8, in the second mode, the image content of the first area 210 may be a static image content or an image content does not need to be updated, and thus the gate signal control circuit 126 stops outputting the pulses of the clock signals CLK and CLKB to drive the scan lines corresponding to the first area 210, as illustrated in dotted blocks 410 in FIG. 8.

In summary, some embodiments of invention are for variant applications of the MAFR panel. When it is not required to update image content of the mask areas (the first areas), the driving period is accelerated by the clock signals, while the unmask areas (the second areas) is boosted to a higher frame rate or maintained at a based frame rate. By accelerating the driving period of the mask areas to compress the time required for the entire frame, it is equivalent to increase the frame rate, and the pulse width of the clock signal is enough to maintain the safe charging time to avoid visual problems.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display driver circuit, comprising:

a gate signal control circuit, configured to output a clock signal to drive a display panel to operate in a first mode or a second mode, wherein the display panel comprises a first area and a second area, and wherein in the second mode, a pulse width of the clock signal driving the first area of the display panel is smaller than a pulse width of the clock signal driving the second area of the display panel, wherein the second area is displayed with a first frame rate in the first mode, and the second area is displayed with a second frame rate in the second mode, wherein the second frame rate is larger than the first frame rate.

2. The display driver circuit of claim 1, wherein the gate signal control circuit is further configured to output an enable signal to drive the display panel, and the enable signal indicates the first area and the second area of the display panel in the second mode.

3. The display driver circuit of claim 1, further comprising:

a digital circuit, coupled to the gate signal control circuit, and configured to generate a horizontal synchronization signal, wherein the horizontal synchronization signal comprises a plurality of pulses, wherein a first width between two pulses of the horizontal synchronization signal corresponding to the first area is smaller than a second width between two pulses of the horizontal synchronization signal corresponding to the second area in the second mode.

4. The display driver circuit of claim 3, wherein the second width in the second mode is equal to the second width in the first mode.

5. The display driver circuit of claim 3, wherein the second width in the second mode is larger than the second width in the first mode.

6. The display driver circuit of claim 5, wherein the display driver circuit receives image data from a processor circuit in a first bit rate in the first mode, and receives the image data from the processor circuit in a second bit rate in the second mode, wherein the second bit rate is slower than the first bit rate.

7. The display driver circuit of claim 1, wherein a frame period of the second mode is smaller than a frame period of the first mode.

8. A display driver circuit, comprising:

a gate signal control circuit, configured to output a clock signal to drive a display panel to operate in a first mode or a second mode, wherein the display panel comprises a plurality of scan lines, and the display panel comprises a first area and a second area, and wherein in the second mode, the gate signal control circuit stops outputting pulses of the clock signal to drive the scan lines corresponding to the first area.

9. The display driver circuit of claim 8, wherein the gate signal control circuit is further configured to output an enable signal to drive the display panel, and the enable signal indicates the first area and the second area of the display panel in the second mode.

10. The display driver circuit of claim 8, further comprising:

a digital circuit, coupled to the gate signal control circuit, and configured to generate a horizontal synchronization signal, wherein the horizontal synchronization signal comprises a plurality of pulses, wherein a first width between two pulses of the horizontal synchronization signal corresponding to the first area is smaller than a second width between two pulses of the horizontal synchronization signal corresponding to the second area in the second mode.

11. The display driver circuit of claim 10, wherein the second width in the second mode is equal to the second width in the first mode.

12. The display driver circuit of claim 10, wherein the second width in the second mode is larger than the second width in the first mode.

13. The display driver circuit of claim 12, wherein the display driver circuit receives image data from a processor circuit in a first bit rate in the first mode, and receives the image data from the processor circuit in a second bit rate in the second mode, wherein the second bit rate is slower than the first bit rate.

14. The display driver circuit of claim 8, wherein the second area is displayed with a first frame rate in the first mode, and the second area is displayed with a second frame rate in the second mode, wherein the second frame rate is larger than the first frame rate.

15. The display driver circuit of claim 14, wherein a frame period of the second mode is smaller than a frame period of the first mode.

16. The display driver circuit of claim 8, wherein the second area is displayed with a first frame rate in the first mode, and the second area is displayed with a second frame rate in the second mode, wherein the second frame rate is equal to the first frame rate.

17. The display driver circuit of claim 16, wherein a frame period of the second mode is equal to a frame period of the first mode.

* * * * *